United States Patent [19]

Pollo

[11] Patent Number: 4,887,480
[45] Date of Patent: Dec. 19, 1989

[54] EXTERNALLY SERVICEABLE BALL SCREW HAVING INTERNAL RETURN MEANS

[75] Inventor: Joseph L. Pollo, Farmington Hills, Mich.

[73] Assignee: American Ball Screw, Livonia, Mich.

[21] Appl. No.: 132,600

[22] Filed: Dec. 14, 1987

[51] Int. Cl.[4] ............................................. F16H 25/24
[52] U.S. Cl. ................................... 74/459; 74/424.8 R
[58] Field of Search .......................... 74/424.8 R, 459

[56] References Cited

U.S. PATENT DOCUMENTS

| | | | |
|---|---|---|---|
| 2,618,166 | 11/1952 | Douglas | 74/459 |
| 2,833,156 | 5/1958 | Spontelli | 74/459 |
| 2,945,392 | 7/1960 | Folkerts | 74/459 |
| 3,176,535 | 4/1965 | Rowland | 74/459 |
| 3,367,201 | 2/1968 | Orner | 74/424.8 |
| 3,580,098 | 5/1971 | Goad | 74/459 |
| 3,766,788 | 10/1973 | Metz | 74/459 X |
| 4,226,137 | 10/1980 | Sharp | 74/459 |

FOREIGN PATENT DOCUMENTS

| | | | |
|---|---|---|---|
| 3138913 | 3/1983 | Fed. Rep. of Germany | 74/459 |
| 920649 | 3/1963 | United Kingdom | 74/459 |

*Primary Examiner*—Allan D. Herrmann
*Attorney, Agent, or Firm*—Gifford, Groh, Sheridan, Sprinkle and Dolgorukov

[57] ABSTRACT

The specification discloses a ball screw having an internal return which is selectively removable externally of the ball nut for servicing. The return is held in place by a spring clip operatively fitted into a dove-tail slot built into the exterior of the ball nut. The provision of the dove-tail slot provides for easy removal and replacement of the internal return, external insertion of the ball bearings when the ball screw must be reassembled for any reason, and, if desired, for shimming the internal return to keep the return at the proper height when the ball screw is rebuilt.

8 Claims, 2 Drawing Sheets

EXTERNALLY SERVICEABLE BALL SCREW HAVING INTERNAL RETURN MEANS

BACKGROUND OF THE INVENTION

1. Field of the Invention

The present invention relates to ball screws of the type having internal return means, and more particularly to an externally servicable ball screw having internal return means.

2. Description of the Prior Art

The advantages of mechanical ball screws as converters of rotary to linear motion with extreme accuracy and low friction has been known in the art for many years. The first type of ball screw to be developed was one having an external return tube whereby the balls interposed between the ball screw and the ball nut travelled outside the actual ball nut to make their return from trailing edge of the ball nut back to the leading edge of the nut for continuous recirculation. It was found, however, that becuase of the additional space required by the external return tubes, many applications could not adapt to the use of such ball screws. Therefore, a ball screw having an internal return means was developed which satisfactorily fit in many smaller spaces. However, it was found that both type of these ball screws have a serious problem as they age and become worn. As the balls and/or ball races become worn, a looseness of fit develops and the ball screws lose their accuracy, although they retain their low friction.

Due to the expense of the ball screw, it has been found desirable to rebuild ball screws to the extent possible, rather than replacing them. Such rebuilding can involve something as simple as placing slightly larger ball bearings in the ball races, to re-turning the ball screw and/or ball nut.

Whichever method of rebuilding is used, a serious problem exists in reassembling the ball screw after it has been disassembled for rebuilding. This involves holding the balls in the races of the ball nut while screwing the ball screw into position. This becomes a problem because, whether the external or internal return means are used, balls cannot be placed into the ball race of the ball nut from the outside of the ball screw assembly. This means that the tracks, must be greased, the balls must be placed in the tracks, and the ball screw carefully rotated in the ball nut to prevent the balls from falling out. It can be understood that this reassembly can be a rather long and laborious process, and may cost more than the actual rebuilding of the ball screw.

SUMMARY OF THE INVENTION

In order to solve the problems of servicing ball screw units I have provided a ball screw having internal return means, and have provided that such internal return means are selectively removable externally of the ball nut for servicing, and yet are positioned so that when the ball bearings must be placed back into the ball screw, the ball bearings may be inserted from outside the ball nut, and the internal return means be may replaced and held in place by an easily removable clip which fits in a dove-tail slot milled into the exterior of the ball nut. The provision of the dove-tail slot and clip provides for easy removal and replacement of the internal return means, and also for shimming the same to keep the return means at the proper height for operation of the ball screw regardless of the wear on the track portion of the internal return means.

Therefore, it is one of the objects of the present invention to make a more easily servicable ball screw.

It is a further object of the present invention to provide a better method of reinserting the ball bearings in the ball race after the rebuilding of a ball screw.

It is a further object of the present invention to make rebuilding and servicing of ball screws less time consuming and less costly.

It is a further object of the present invention to make a ball screw wherein the balls may be inserted into the ball races from a position external to the ball nut.

It is a still further object of the present invention to provide for an externally servicable ball screw of the foregoing nature having internal return means.

Further objects and advantages of the present invention will become apparent from the following description and appended claims, reference being made to the accompanying drawings forming a part of the specification, wherein like reference characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENT

Figure 1:
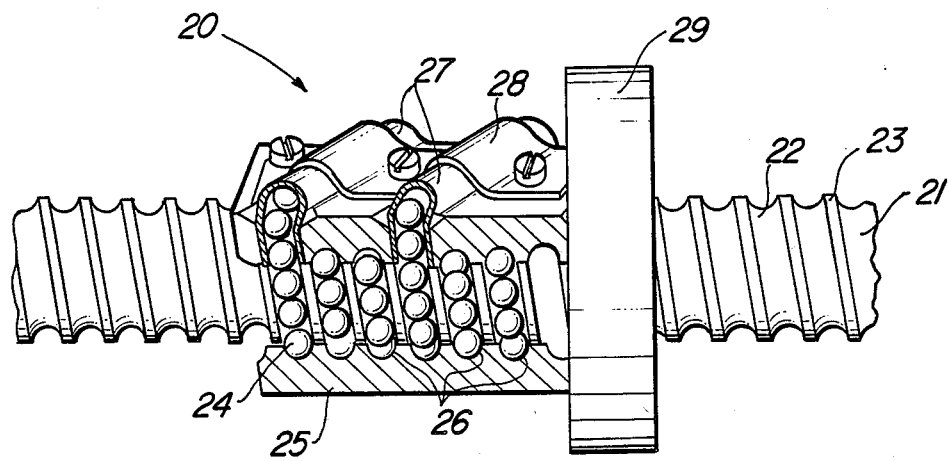
FIG. 1 is an elevational view, partly in section, of a prior art ball screw having external means.

Referring now to FIG. 1 there is shown an example of the oldest type of ball screw, that being an external return ball screw assembly generally designated by the number 20, consisting of a ball screw, generally designated by the numeral 21 and having a helical ball race 22 formed between the threads 23. The pitch and depth of the ball race will depend upon the particular application to which the ball screw is to be put. To provide for movement between the ball screw 21 and the ball nut 25 there is provided on the ball nut 25 a plurality of complimentary ball races 26 equal in pitch to the ball screw 21.

As is well known in the art, to provide for continuous operation of the ball screw, the ball bearings 24 must continuously move from the beginning of one circuit, in this case consisting of three turns of the ball race 22, to the end of the same circuit, and then through the external return tube 27, to continuously circulate. The external return tubes 27 are held in place by clips 28. A flange 29 aids in retaining the ball screw in place.

Figure 2:
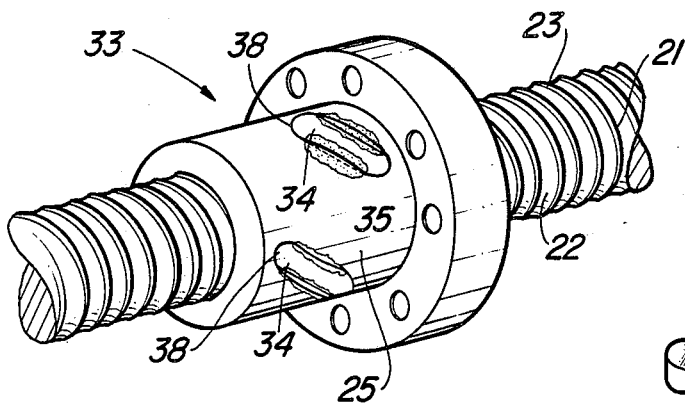
FIG. 2 is a perspective view of a prior art ball screw having internal return means which are not externally removable, and which are sealed against the elements by an expoxy coating.
Figure 3:
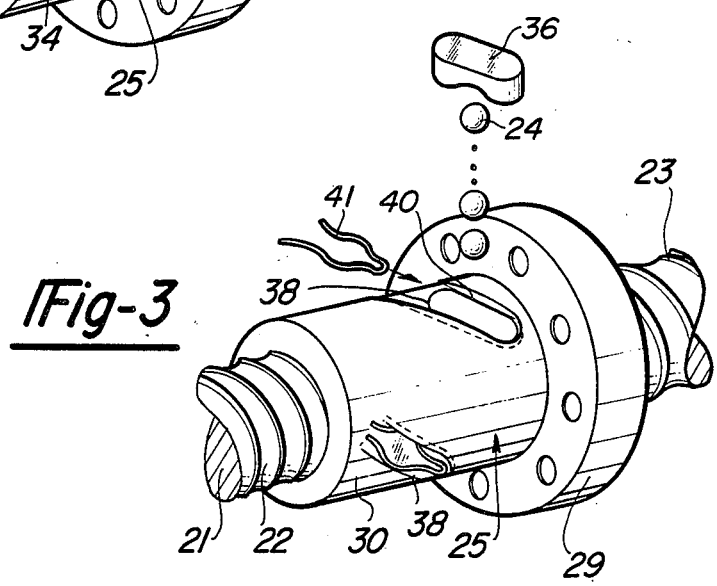
FIG. 3 is a perspective view of my improved ball screw having an internal return insert held in place by a spring clip which fits in a dove-tail slot milled into the outside of the ball nut.
Figure 4:
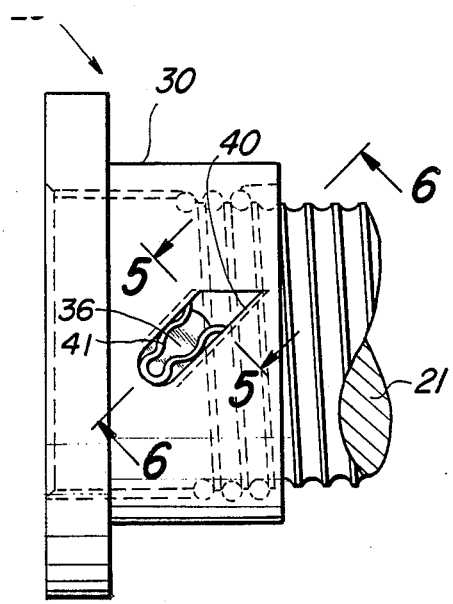
FIG. 4 is an elevational view of the construction shown in FIG. 3.
Figure 5:
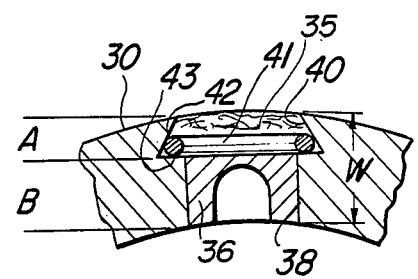
FIG. 5 is a sectional view, taken in the direction of the arrows, along the Section Line 5—5 of FIG. 4.
Figure 6:
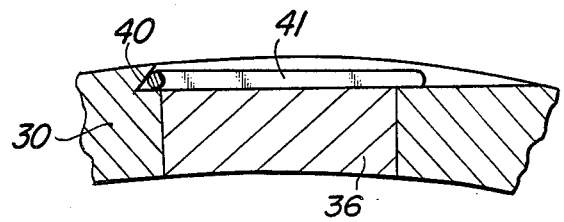
FIG. 6 is a sectional view, taken in the direction of the arrows, along the Section Line 6—6 of FIG. 4.

Referring now to FIG. 2, a more recent development in the ball screw art has been the provision of a ball screw having internal return means 34 provided in place of the external returns tubes 27. The internal return means 34 cannot be removed externally of the ball nut 25 because they are held in place from the interior of said ball nut, and must be removed from the inside. An epoxy coating 35 is necessary to seal the internal return means 34 because they are not sealed from the elements to the same degree as the external return means 27. The rest of the construction of the internal return ball screw assembly 33 is substantially identical to the external return ball screw assembly 20, having a ball screw 21, a helical ball race 22 separated by threads 23, and ball bearings 24 (not shown) interposed between the ball nut 25 and the ball screw 21.

In both of the prior art ball screws, as discussed above, when the ball screw becomes worn and it is necessary to service the same, the ball screw 21 is screwed out of the ball nut 25, and the ball bearings 24 are removed. The ball screw 21 and/or ball nut 25 are serviced, as needed, and the same or larger ball bearings 24 must then be placed between the ball screw and the ball nut. At the present time, this can only be done by greasing the ball race 22 of the ball nut 25, placing the ball bearings around the perimeter of the interior of the ball nut, and attempting to screw in the ball screw 21 without disloding the balls. This is required because the internal return means 34 are not removable externally of the ball nut 25 because of the flanges or other holding means (not shown) which prevent their removal. Such flanges are needed to insure that the internal return is not forced out through the return opening 38 destroying the epoxy seal 35.

Figure 8:
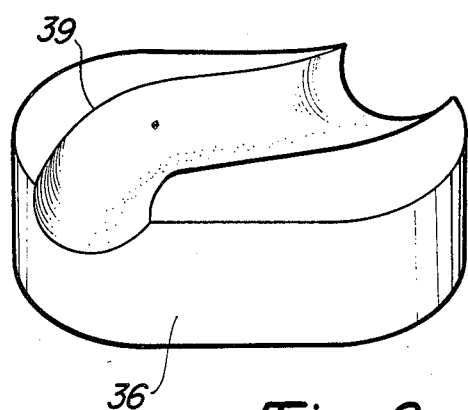
FIG. 8 is a perspective view of the internal return means shown in FIGS. 3-7.

Also the forces exerted by the ball bearings on the ball nut and the internal return are too great to depend upon the epoxy seal holding the internal return in place, and thus the internal retaining means are needed. However, as previously discussed, this prevents loading the ball bearings externally during reassembly, and also prevents any motion on the part of the internal return means 34, it being fixed in place. Also, it has been found desirable to provide for a "rocking" motion of the return to prevent problems from arising should a piece of debris happen to be present in the ball race as one of the ball bearings 24 is attempting to traverse the return race 39 in the internal return insert 36 (FIG. 8). For ease of understanding, I have designated the externally removable internal return means of the present invention as the "internal return insert 36" to distinguish it from the fixed internal return means 34 of the prior art. However, the combination of the internal return insert 36, the return opening 38, and the spring clip 41, with or without the shim 45, still will be referred to as constituting the "internal return means" of the present invention. If the internal return insert 36 can "float", the ball will not become jammed between the debris and the return race 39. However, this floating or rocking motion is not possible with the conventional construction.

Another problem also arises in ball screws having fixed internal return means, and that is the necessity of supplying new internal return means to compensate for wear. Since the relative height between the return race 39 and the relevant portion of the ball race 22 is fixed, once the return race 39 becomes worn, in many rebuilding applications there is nothing to be done except to discard the internal return means 34. This results in a great deal of waste and expense, and may improved construction provides not only for external loading of the ball bearings, and a rocking motion of the internal return insert 36, but also for a height adjustment of the internal return insert 36, thus, solving many longstanding problems in the art.

Referring now to FIGS. 3–6, my improved construction can be seen. As before, a conventional ball screw 21 having a helical ball race 22 with a helical thread 23 is used. I make no changes in the standard ball screw in my improved invention. However, the ball nut 25 having flange portion 29 and body portion 30 has the external area of the body portion 30 modified proximate the return openings 38. As can best be seen by FIGS. 4 and 5, a dove-tail slot 40 is milled into the outer diameter of the body portion 30 of the ball nut 25. Thus, the overall height of the return opening 38 is reduced from its previous height of W, representing the wall thickness, by a distance A, representing the depth of the dove-tail slot, to a total height of B.

Likewise, the height of the internal return insert 36 is reduced to a height of B, or less, as will be hereinafter explained. In my construction, as in the prior art, there is no means to restrain the internal return insert 36 from travelling downwardly and contacting the ball nut if the ball races were empty. However, this situation never exists, because upon reassembly after whatever rebuilding operations are necessary, the ball screw 21 will be placed inside the ball nut 25, and ball bearings will be added through the return opening 38 until the ball races 22 are completely filled with ball bearings 24, and the internal return insert 36 will then be kept from contacting the ball race of the ball nut by the ball bearings.

However, as previously mentioned the real need for retention is to prevent the internal return insert 36 from travelling outwardly due to the centrifugal force of the ball bearings 24 in the ball race 22. This is accomplished by the provision of a spring clip 41, which is compressed sufficiently to fit into the dove-tail slot 40, and is held in place by abutment against the side wall 42 and the bottom wall 43 of the dove-tail slot 40. It is to be understood that the particular size and strength of the spring clip 41 will be chosen in relation to the particular application to which my improved ball screw is to be put, just as the size of the ball bearings 24, the ball nut 25, and the ball screw 21 would be. The strength and size of the clip would be chosen such that there is no possible way for the clip to be expelled from the dove-tail slot 40 during operation. This can be done by determining the centrifugal force expected to be put on the internal return insert 36 by the centrifugal force of the ball bearings 24, and a then a proper clip can be chosen such that the force needed to expel the clip exceeds by the appropriate safety margin the forces expected to be put thereon.

Figure 7:
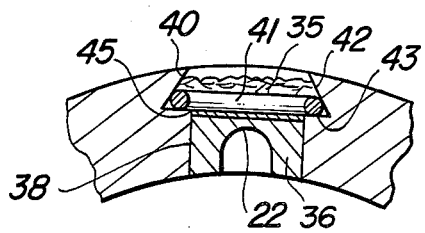
FIG. 7 is a sectional view, similar in large part to FIG. 5, but showing a shim inserted between the internal return insert and the spring clip.

Referring now to FIG. 7, there is shown a modification of my invention which is particularly useful when the ball screw has been in use for sometime and needs to be rebuilt. Rather than replacing the internal return insert 36, to effectively reduce the height of the ball race 22, a shim 45 is inserted between the internal return insert 36 and the spring clip 41. Of course, the appropriate amount of material will have to be removed from the bottom of the internal return insert 36 so that it does not interfere with the operation of the ball screw. In this manner, the expense of replacement of the internal return means is eliminated.

If desired, an epoxy coating 35 (shown in FIGS. 5 and 7 for purposes of ilustration, but not shown in FIGS. 4 and 6 for ease of understanding the invention) can be placed into the dove-tail slot 40 to seal the return opening 38 and prevent dust and dirt from getting into the ball screw much as was done in the prior art.

The fit between the return opening 38 and the internal return insert 36 will depend upon the particular application of the ball screw. If it desired to provide for the aforementioned "rocking" motion, there may be a somewhat loose fit between the opening 38 and the return insert 36, with sufficient difference in the height B of the return opening 38 and the internal return means 36 to provide for such motion. If such motion is not desired, the height of the internal return insert 36 and the return opening 38 may both be equal to B. And, in addition, a press fit may be provided to provide additional resistance to any movement of the internal return insert 36.

Thus, by carefully considering the problems present in the art of building and repairing ball screws I have developed a novel ball screw which solves several longstanding problems in the art.

I claim:

1. An improved ball screw assembly including:
   (a) a ball screw having a helical ball race,
   (b) a ball nut having an externally servicable internal return means, and a complementary ball race, said externally servicable internal return means including:
      (i) at least one return opening provided in said ball nut,
      (ii) an internal return insert operatively mounted in said return opening, and
      (iii) means to removably retain said internal return insert in said return opening, wherein said retaining means include:
         (a) a dove-tail slot provided contiguous with said return opening,
         (b) a spring clip mounted in said dove-tail slot to retain said internal return insert, and
   (c) a plurality of ball bearings inserted between said ball screw and said ball nut.

2. The device defined in claim 1, and including:
   (a) a shim interposed between said internal return insert and said spring clip.

3. The device defined in claim 1, and including:
   (a) an epoxy seal over said return opening.

4. The device defined in claim 2, and including an epoxy seal over said return opening.

5. The device defined in claim 3, wherein said internal return insert has a loose fit in said return opening.

6. The device defined in claim 4, wherein said internal return insert has a loose fit in said return opening.

7. The device defined in claim 3, wherein said internal return insert has a press fit in said return opening.

8. The device defined in claim 4, wherein said internal return insert is press fit in said return opening.

* * * * *